United States Patent [19]
Haas

[11] Patent Number: 5,775,179
[45] Date of Patent: Jul. 7, 1998

[54] DEVICE FOR SETTING SAWBLADES

[76] Inventor: Hans Robert Haas, Emilienstr. 56, 42853 Remscheid, Germany

[21] Appl. No.: 645,957

[22] Filed: May 10, 1996

[30] Foreign Application Priority Data

May 12, 1995 [DE] Germany .......................... 195 17 482.8

[51] Int. Cl.⁶ .................................................. B23D 63/04
[52] U.S. Cl. .................................................. 76/61; 76/58
[58] Field of Search .................................. 76/58, 61–63, 76/65–68, 70

[56] References Cited

U.S. PATENT DOCUMENTS 4,112,789  9/1978  Idel ............................................. 76/58

FOREIGN PATENT DOCUMENTS

| C-470 527 | 1/1929 | Germany . |
| 1 090 492 | 10/1960 | Germany . |
| 1 127 687 | 4/1962 | Germany . |
| U-86 27 736 | 2/1987 | Germany . |
| 36 26 068 | 2/1988 | Germany . |
| A-36 26 068 | 2/1988 | Germany . |

*Primary Examiner*—Douglas D. Watts
*Attorney, Agent, or Firm*—Herbert Dubno

[57] ABSTRACT

A sawblade machine has its setting members disposed adjacent the sawblade in nonclamping engagement therewith and defining an angle of the setting surfaces in excess of the angle defined between the outer planes of the teeth in the starting position. The setting members are then rotated to the teeth and returned to the starting position whereupon the clamping heads are relieved and the blade advanced.

18 Claims, 6 Drawing Sheets

DEVICE FOR SETTING SAWBLADES

FIELD OF THE INVENTION

My present invention relates to a device for setting sawblades and, more particularly, to a device of this type in which the sawblade is clamped between a pair of clamping heads of clamping members below the tooth-foot line while a pair of setting irons, tools or members lie against the teeth and are movable transversely to the sawblade to set the teeth.

BACKGROUND OF THE INVENTION

A device for the setting of teeth of a sawblade is described, for example, in DE-GM 86 27 736.

With this device, the setting tools or members are pressed with the setting surface, i.e. the surface of the setting head, laterally against the clamped sawblade. The setting tools themselves can be angularly displaced in opposite senses to force the teeth with their alternately succeeding setting or head surfaces of these tools to one side or the other and thereby provide the set on the row of teeth.

The setting tools can then be spread apart sufficiently that after release of the clamping heads the bandsaw blade is not hindered, thereby allowing the blade to be moved past the setting heads until the next group of teeth to be set are positioned in juxtaposition with the setting tools.

This machine has been found to be highly effective in practice. High setting speeds, however, are achievable only with difficulty.

It is known to provide a setting machine in which the setting tool is angularly displaced about an axis lying externally of the sawblade against the teeth. The setting tool is in that case brought laterally against the upright teeth to press the latter out of the median longitudinal plane of the blade, i.e. the sawblade plane. By a further swinging of the setting tool, the teeth are bent or deflected until they achieve the desired setting angle.

This system has the significant drawback in that the initial lateral contact between the tool and the tooth is a point contact. The force is applied over a limited area, especially at the start of bending or setting which can result in a distortion of the lateral flank of the tooth and a loss in sharpness.

The contact zone between the tool and the lateral flank of the tooth to be set tends to change in this system from a point contact to a surface contact. The resulting relative movement of the engaging surfaces of the tool and the tooth can also result in loss in sharpness.

Finally, it can be mentioned that with this known setting device, it is difficult, if not impossible, to maintain a precision of less than 1/100th mm, since during the setting process, precise lateral guidance of the teeth does not occur. If one considers the tooth in cross section, one finds that there is no bending line which is fixed for all teeth during the setting operation, i.e. the bending line moves through the teeth. As a consequence, this device tends to provide a continuous bend, beginning at the region of the tooth foot, i.e. the region of the root of each tooth, and extending to the head of the tooth so that at the utmost the tips of the teeth lie within the appropriate setting angle to the blade.

While these drawbacks are avoided with the system of DE-GM 86 27 736, the precision and speed of operation of that system requires improvement.

OBJECTS OF THE INVENTION

It is the principal object of the present invention to provide an apparatus or device for the setting of sawblades which permits precisions of less than 1/100 mm to be obtained at a minimum of apparatus cost and complexity and enables other drawbacks of earlier systems to be obviated.

Another object of the invention is to provide an improved device for the setting of sawblades, especially of the sawblades, which can expedite the setting and nevertheless afford a high precision in such setting.

A more important object of the invention is to provide an improved sawblade setting device which represents an advance over the art described above.

SUMMARY OF THE INVENTION

These objects and others which will become apparent hereinafter are attained, in accordance with the invention by providing that the setting tools (setting irons) on both sides of the blade are held in respective starting or ground positions in which both setting members lie against the sawblade free from a clamping action thereagainst and have setting surfaces or head surfaces juxtaposed with and engageable with the teeth which include a head-surface angle which is greater than or at least as great as the envelope angle of the set teeth. The envelope angle is here defined as the angle between the outermost side planes of the set teeth.

The blade, of course, is engaged during the setting operation between a pair of clamping heads or members which are movable against the blade from opposite sides and engage the blade below the tooth-foot line, i.e. the line of the tooth feet of the row of teeth.

More specifically, the setting device of the invention can comprise:

a pair of clamping members disposed on opposite sides of a sawblade having a row of teeth to be set and engageable with the opposite sides below a tooth-foot line of the row;

means operatively connected with the clamping members for pressing the clamping members against the sides of the sawblade;

a pair of setting members on opposite sides of the row of teeth and having respective setting surfaces juxtaposed with teeth of the row, the setting members having starting positions in which the setting members are in clamping-free engagement, with the sawblade above the tooth-foot line, the setting surfaces defining a setting-tool angle between them in the starting position which is at least equal to a setting angle defined between the outer teeth side planes of the set teeth; and means for displacing the setting members to press the setting surfaces against the teeth of the row and set the teeth so that outer tooth side flanks of set teeth lie in the outer tooth side planes at the setting angle.

The system of the invention provides the advantage that the setting tools or members need not be displaced in the direction transverse the sawblade for each setting action, but rather can remain in their starting position while the clamping heads or members are released and the blade moves along the device to be repositioned with a new group of teeth juxtaposed with the setting tools since the setting tools can assume a starting position in which they lie against the sawblade but do not clamp it between them. This starting or ground position is characterized by the fact that it allows the sawblade to shift longitudinally without a retraction of the setting tools transversely from the ground position. The slight contact between each tool and the sawblade can remain effective without a clamping of the sawblade between the tools to prevent lateral movement of the sawblade during the longitudinal repositioning.

The clamp-free engagement of the sawblade by the tools in the ground position is thus defined as a light contact of the two tools with the sawblade such that longitudinal repositioning is not precluded. The clamp-free engagement of the setting tools or members with the sawblade in the starting or ground position is an important aspect of the invention.

In this clamp-free condition, the setting tools can be retained until the sawblade is longitudinally repositioned for the setting of the next group of teeth or after completion of the setting operation and until the blade is reclamped between the clamping heads. As noted during such movements of the sawblade, the setting tools lie in only light contact with the sides of the teeth and the teeth are in only light contact with the setting surfaces of the tools, preferably at most in line contact therewith.

The tools themselves can be moved into position by a movement transverse to the sawblade but once in position in tooth setting are retained in this position being capable only of angular displacement from the starting or ground position.

Thus in a preferred embodiment of the invention, the setting tools are movable in opposite senses, i.e. counter to one another only angularly from their ground or starting positions and preferably simultaneously to set respective teeth or groups of teeth in opposite directions. For this purpose, the setting tools can be guided along preferably circular guide paths together with any mechanism which holds the tools in the ground or starting position and which may bias the respective setting tool lightly against the workpiece.

According to a further feature of the invention, each setting tool member is displaceable along the circular path which can be centered on the line of contact between the setting tool and the sawblade in the starting or rest position of the setting tools. The means for angularly displacing the setting tools can be that which is described in DE-GM 86 27 736 if desired.

According to another feature of the invention, the setting tools or members can have bevelled setting head surfaces juxtaposed with the teeth of the sawblade and bearing thereon to set the teeth. The bevel is selected to be sufficient to set back the setting surfaces in the starting or ground position of the setting tools from the previously set teeth of the blade enabling the latter to pass the setting tools during repositioning of the blade without contact between the setting surfaces and the set teeth of the blade.

The setting tools can have a more than "180° starting position" into which the setting tools are pivotable in the setting-anti-direction to establish the aforementioned setting tool angle between them and enabling the previously set teeth to pass these surfaces without contact during repositioning of the blade.

It has been found to be advantageous to provide the contact line between the setting tools and the sawblade in the starting or ground position of the setting tools so that this contact line lies along the tooth foot region. This is especially of advantage when the sawblade is a bandsaw blade in which the tooth foot line is entirely rectilinear. This avoids additional internal stresses at the tooth foot region upon setting of the sawblade.

For precise bending of the teeth to one side or the other at the tooth foot region, the clamping heads must lie as close as possible to the setting or head surfaces of the setting tools or members. If the setting surface angle of the clamping tool is not to be too acute, as is desirable to avoid stability problems, it is advantageous for the clamping heads to be inclined downwardly away from the sawblade plane. In this case, the upper surfaces of the clamping heads or members can include an angle less than 180° between them and the open angle between these surfaces and the sawblade plane can exceed 90°. The setting tools can then be swung to the 180° position without impediment by engagement with the clamping heads or members or even slightly beyond the 180° position in returning to the starting position, while nevertheless providing the clamping surfaces of the clamping heads or members so that they are close to the contact lines between the setting tools and the blade.

According to another feature of the invention, the angular displacement of the setting tools or members is effected by an electric motor drive and a cog or toothed belt transmission between the motor and holders for the respective setting tools or members. This arrangement provides a drive free from play which allows the electric motor to position the setting tools with great accuracy as measured in terms of minutes of a degree or fractions thereof. The electric motor itself may be a so-called three-phase servomotor which is electronically controlled by an electronic angle generator connected in a servocontrol circuit. The circuit can compare the actual pivotal displacement with a setpoint angular displacement and can correct the actual angular displacement to match the setpoint.

A tachogenerator can be coupled to the motor shaft so that it outputs a signal dependent upon the angular position or speed thereof to thereby signal the actual angular displacement.

In this manner it is possible to monitor the setting process so that the setting precision can be in the $\frac{1}{100}$ mm range. However, it is possible to make the precision even more precise 4, in addition, the actual setting is measured together with the thickness of the sawblade. The latter measurements are especially advantageous in the case of bandsaw blades which are made up of strips butt-welded together. In the regions of the junctions between such strips, thickness variations can occur which can influence the precision of the setting process. So that the set angle is as precise as possible within the tolerance range permitted for a predetermined setpoint, the thickness measurement of the sawblade can be utilized in carrying out the correction of the actual set angle to meet the setpoint.

It has been found to be advantageous, moreover, also as a contributory to the production of high quality sawblades, to monitor the setting operation and, upon the development of a defect or failure, e.g. a tooth defect or a defect in a group of teeth, to generate a warning signal and/or to shut down the machine.

To avoid additional mechanical costs and yet provide a further improvement in the precision, the clamping heads or members can be hydraulically actuated. This permits a piston and cylinder device to act directly on the clamping head and eliminate the need for force transmission mechanisms, links, rods and the like. The flexible hydraulic supply conduits can easily be connected to the clamping heads from the exterior to the hydraulic cylinders.

It has been found that a further increase in precision of the setting operation can be obtained by providing relative height adjustment of the setting device and the sawblade or band saw. In this case the contact line of the setting tools can be made to coincide with the tooth foot line over multiplicities of teeth and thus over the entire length of the sawblade or the band saw.

The device according to the invention is especially advantageous for the setting of a sawblade in the form of a band saw which can be drawn from a supply coil upstream of the setting unit and wound up on a take-up coil downstream of the setting unit. Preferably the band saw is advanced downstream of the setting unit by a conveyor device. This ensures a continuous stretch on the blade of the saw.

It has been found further that the precision of the setting of saw bands can be improved by taking steps following the setting process to avoid a reduction in the sharpness of the blade. This can be achieved by winding a separating material between the turns of the saw band on the take-up coil. The material can be supplied from a separator coil. In practice it has been found to maintain sharpness in the set sawblades which have a precision in the $1/100$ mm range and to suppress the loss of precision which can result when successive turns of the saw band are wound on each other directly. With the intervening separator, the saw band can be wound more tightly than would otherwise be the case. Since contact of successive turns with sensitive flanks of the saw teeth need not be feared when the separator is used, the coiling tension can also be increased. The higher coiling tension, moreover, prevents slip between successive turns or substantially reduces such slip which may also contribute to a lowering of the sharpness of the blade.

The separating material between turns not only appears to suppress the contact between the lateral tooth flanks of neighboring turns, therefore, but also limits or eliminates possible relative movement of the successive turns by the high coiling tension and which can suppress deterioration of the blade which can result from relative movement of successive turns. The separating material can be in the form of a strip of substantially the width of the sawblade although, if a narrower material is used, it is preferably applied at least in the regions of the blade teeth.

A high pressing-force due to tension between two adjacent winding layers can ensure that the separator therebetween is reliably fixed. A layer of adhesive strength is not necessary.

The separating material can be fed to the take-up coil at any optional location although it has been found to be advantageous to supply it simultaneously with the take up of the saw band from a separator coil in the vicinity thereof. This eliminates the need for additional guide means for the feed of the separator strip to the coil.

The separator strip can be a paper-like strip although the composition and thickness of the separator strip may be varied as desired. It has been found to be advantageous to select such materials and thickness as will preclude penetration by the teeth of the sawblade.

A preferably used device for forming a coil according to this invention starts with a setting machine known per se. In this case, the non-set band is drawn off from an unwinding coil, passed through the setting unit and fed to a rewinding coil as the set sawblade.

According to the invention the axis of the separator coil can be parallel to the axis of the take-up coil to avoid fluctuations in the feed of the separator strip. The separator coil can be a freely rotating coil so that no separate drive need be provided to supply the separator strip which is pulled into the take-up coil. The invention can be applied to a hardening unit and the saw band to be hardened can be drawn form a supply coil. The set sawblade can be hardened and recoiled. When a hardening system is used, the separating material can be coiled up as it is removed from between the turns of the blade coil. The blade can then be recoiled after hardening without insertion of a separating material since there is no danger of damage to the lateral flanks of the teeth after hardening.

The wound up separating material can be used as a separator for a subsequent operation. In the case in which the saw band must be recoiled prior to hardening, the separating material can be withdrawn from the supply coil and fed to the take-up coil. In that case there need not be any intervening storage of the separating material since the unwinding and recoiling of the separating material can take place simultaneously with the uncoiling and recoiling of the saw band. The manner in which the teeth pass through the hardening device can be selected so that the teeth are hardened from the back side.

In the case in which the sawblade must be recoiled initially prior to the hardening process, the separator material can be drawn off the unwinding coil together with the sawblade and fed to the rewinding coil. Thus there is no intervening storage of the separating material, but rather a simultaneous unwinding and rewinding of both separating material and sawblade.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
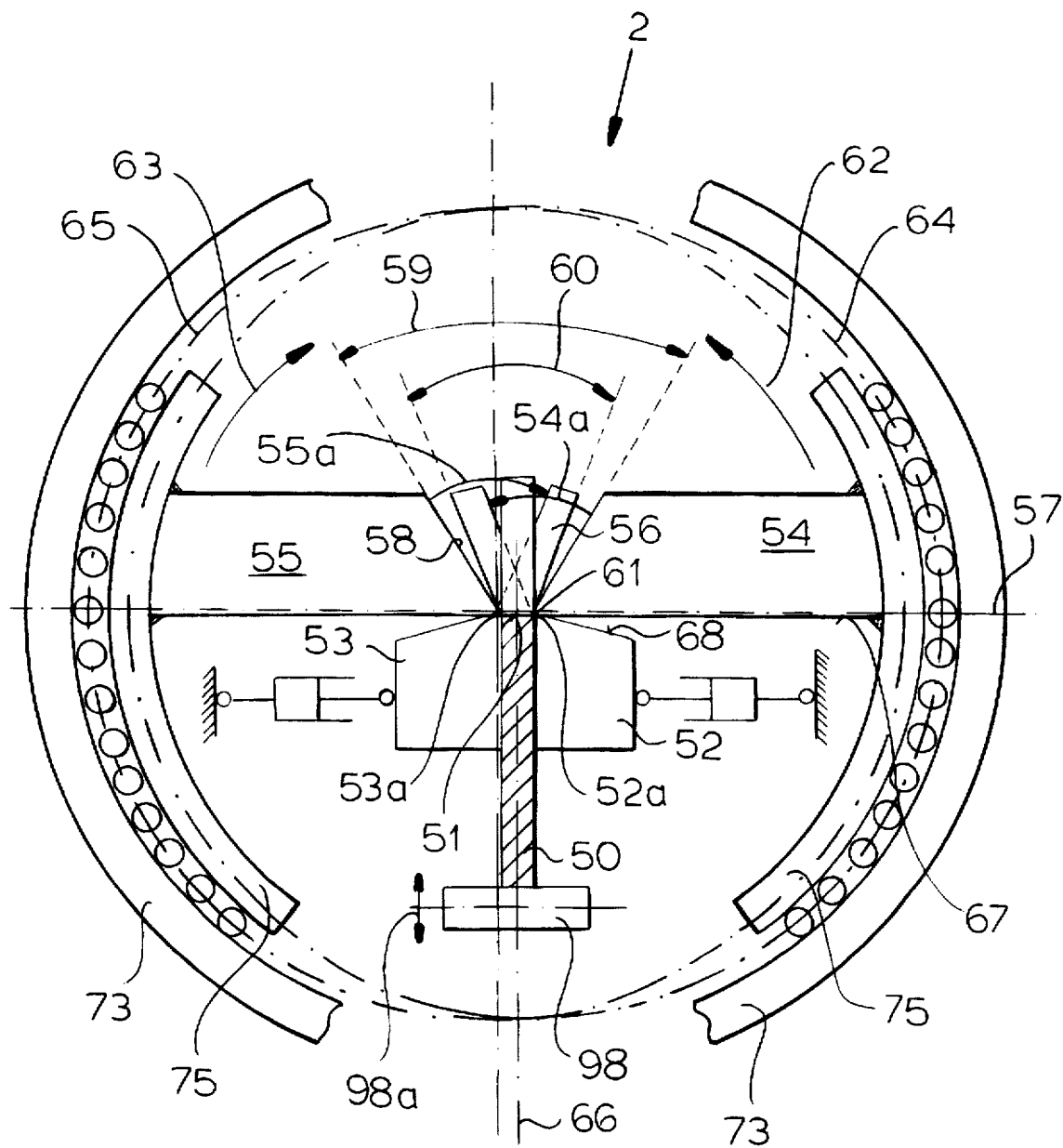
FIG. 1 is a diagrammatic cross sectional view of a portion of a tooth setting device according to the invention.

In FIG. 1 I have shown a device 2 for setting sawblades according to the present invention. Essentially the device comprises a pair of clamping heads or clamping members 52, 53 disposed on opposite sides of the sawblade 50. The sawblade 50 is clamped between these heads 52, 53. Upon opening of the clamping heads 52, 53. i.e. spreading them apart, the sawblade can be drawn between the clamping surfaces of the heads.

On their upper sides, the heads 52 and 53 have relatively sharp edges 52a, 53a which are located at the same level as the tooth foot line 51 of the sawblade 50. A height adjuster 98 is provided and can be displaced in the direction of arrow 98a to adjust in the vertical direction the position relative to the edges 52a and 53a. The height adjuster 98 is engaged with the bottom of the sawblade 50. Alternatively, the height adjustment means can act upon the clamping unit formed by the clamping heads 52 and 53.

For the blade 50 to be properly positioned, the edges 52a and 53a must coincide with the tooth-foot line 51. Since blade 50 is fed by a supply coil and is taken up by a take-up coil as will be described in greater detail hereinafter, these coils can be height-adjustable relative to the machine support and/or the setting device.

Above the tooth-foot line 51 and extending transversely to the sawblade 50 and movable against the teeth 56, are the setting tools or irons 54, 55, hereinafter referred to as setting members.

On their sides turned toward the sawblade 50, the setting members 54 and 55 are formed with fingers which can engage alternating teeth of the blade 50, i.e. a finger of the setting member 54 is followed by a finger of the setting member 55 so that alternate teeth are engageable from opposite sides by the setting members.

The two setting members 54, 55 on opposite sides of the blade 50 have a starting, ground or rest position as shown in FIG. 1 which has been represented at 57 and in which the setting members 54, 55 engage clamp-free against the blade 50.

While it is possible to arrange the setting members 54, 55 so that in the starting position they and the associated setting or head surfaces 58 juxtaposed with the teeth, are completely out of contact with the sawblade 50, it is preferred that the edges 61 of the setting members 54, 55 which can be located at the tooth-foot line 51, slightly contact the blade 50 so that the latter is free to move when the clamping heads are spread apart, even under this contact.

What is important for the purposes of the present invention, therefore, is that in the starting position, the blade 50 is not clamped by the setting members 54 and 55 so that longitudinal movement of the sawblade will not be impeded once the clamp is opened.

It is also important that the setting surfaces 58 define with one another a setting tool angle 59 in the starting position that is at least equal to or greater than the setting angle 60 defined between the planes of the outer surfaces of the set teeth 56. The important advantage of the invention resides in the limited number of degrees of freedom of movement of the setting members 54 and 55 as described.

Since the starting position 57 of the setting members 54, 55 sets the setting surfaces 58 away from the sawblade 50, a linear drive for the setting members 54, 55 which will move them away from and toward the sawblade is no longer necessary. To accomplish the setting of the teeth, the setting members need merely be swung in opposite senses about the contact points 61 as axes through an angle 54a or 55a to set the teeth 56. The setting members 54 and 55 can be guided along the respective angular paths which can be accomplished according to the invention, by providing circular guides for the respective setting members 54, 55 centered on the respective contact lines 61. A relative movement between the side flanks of the teeth and the setting surfaces 58 of the setting members 54, 55 is thus excluded. This ideal case requires a geometrically precise coincidence between the angular displacement axes of the setting members and the locations at which they contact the teeth in a clamping-free manner.

The system has been found to be effective as any play between the surface 58 and the corresponding lateral flank of the teeth of the sawblade is several hundredths of a millimeter or even about 1/100 mm. The setting members are preferably swung in opposite senses simultaneously so that bending forces are applied to successive teeth symmetrically and in opposite directions so that these forces can be taken up by the sawblade with balance between them and minimal development of stress.

The coincidence of the pivot axes with the contact lines 61 as indicated can be accomplished by having the respective pivot movements 62, 63 guided along circular paths which are concentric with the respective contact points 61. For this purpose, each setting member 54, 55 is guided along a circular guide path 64, 65, which can be a roller bearing bed, on a respective holder or support 73.

FIG. 1 also shows that the upper sides 68 of each clamping head 52, 53 can include an angle greater than 90° with the median plane 66 of the sawblade so that these upper sides 68 together can include an angle less than 180°. When the setting members 54, 55 are in their starting positions 57, the undersides 67 thereof are substantially parallel to the upper side 68 of the clamping heads 52, 53.

Between the upper side of each clamping head 52, 53 and the lower side of the respective setting member 54, 55 a certain play is provided. It is important that the edge 52a, 53a of the clamping member and the edge or contact point 61 of each setting member 54, 55 lie substantially in the region of the tooth-foot line 51 to ensure a distortion-free setting of the individual teeth 56.

Figure 2:
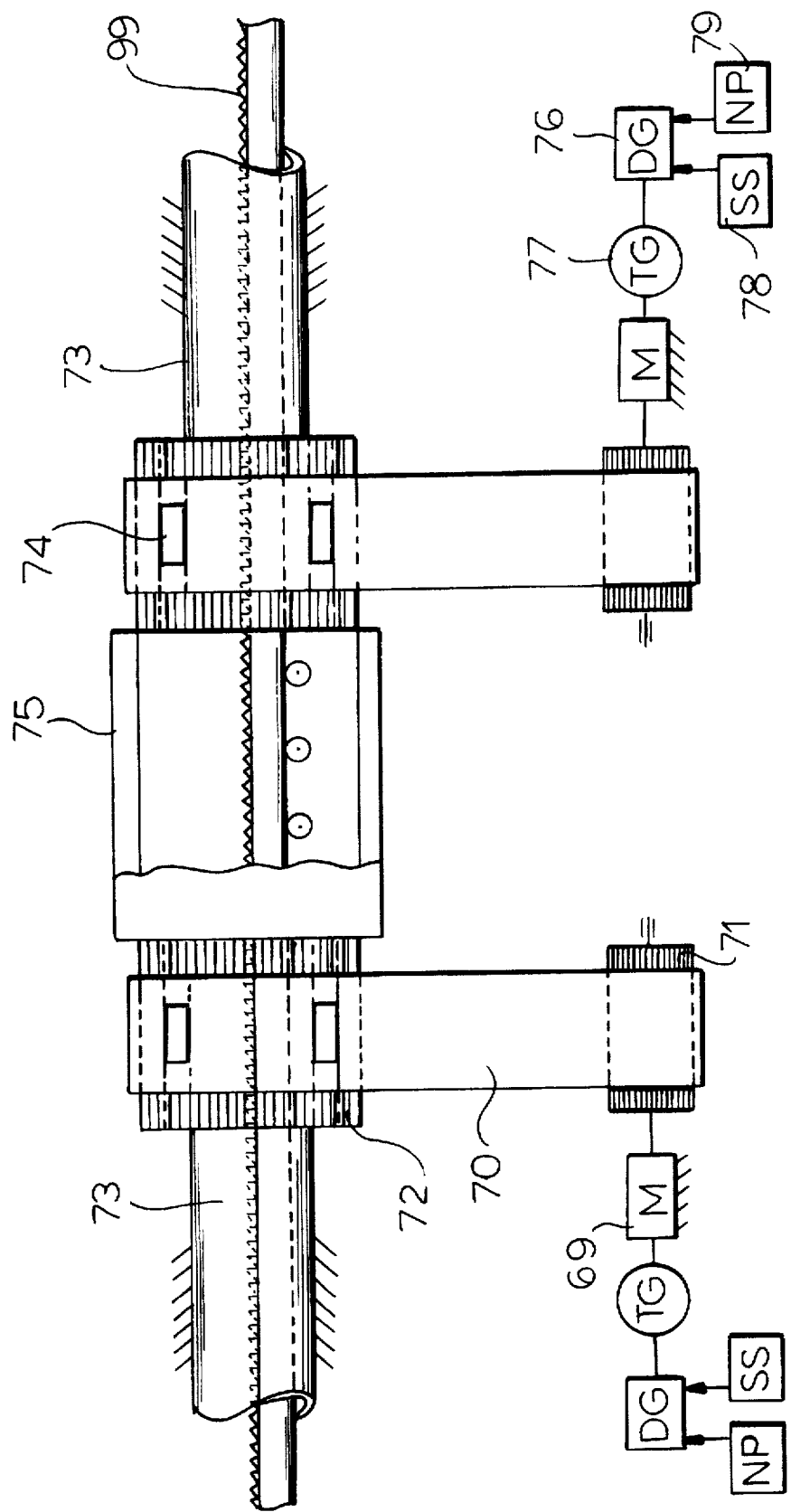
FIG. 2 is a diagrammatic side elevational view showing the drive of the setting tools for the device of the invention.

As can be seen from FIG. 2, the setting members are provided on two setting drums 75 which can be driven by respective electric motors 69 via cog or toothed belt transmissions as represented at 70. For each of the setting drums 75 (see also FIG. 1), a locally-held support tube 73 can be provided. The free end of each support tube 73 has a bearing region 74 at which a respective cog wheel 72 engaged by the belt 70 is rotatably driven. The belt driven wheels 72 are then connected to the respective drums 75.

The endless cog belts 70 are driven, in turn, by toothed pulleys 71 connected to the motor shaft of electric motors 69. The motors 69 are so-called three-phase servomotors whose angular displacement is given by a tachogenerator 77 connected to the motor shaft. The tachogenerator is controlled by angle transmitter 76 which receives zero point setting from a zero-point transmitter 79 and an input from a stepping counter 78 which is pulsed by a tachometer connected to the motor 69. This digital control of the servomotor in combination with the slip-free and play-free belt drive allows positioning of the setting member with precision at high setting speeds by the precision positioning of each setting member along its circular path around the contact point 61 with an accuracy in the millimeter or fraction of a millimeter range.

Figure 4:
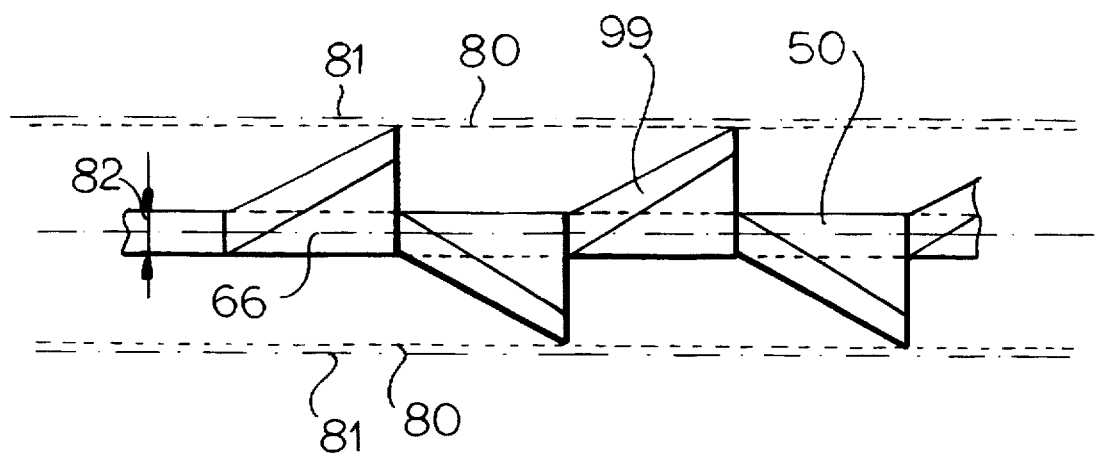
FIG. 4 is a diagram showing the set teeth and relating the actual set to a setpoint set.

As can be seen from FIG. 4 which shows a plan view of the edge of the sawblade 50, on both sides of the median sawblade plane 66, the actual setting 80 is determined and compared with a predetermined setpoint setting which has been diagrammatically represented at 81 as different from the actual value 80. The servosystem corrects the actual setting to ultimately coincide with the setpoint setting. For this purpose, on both sides of the sawblade 50, measurement lines 80 are defined. If possible, these measurement lines should coincide with the previously described setpoint lines 81.

Stated otherwise, deviations of the actual setting 80 from the setpoint setting 81 results in a stepping of the counters 78 correspondingly to advance or retard the drive of motor 69 on the respective side to bring the actual setting back to the setpoint setting. In order to get the lines 80, 81 coincided, the monitoring of the actual set is preferably effected by a contactless sensor, e.g. optoelectronically.

The resulting reaction speed and resetting of the motor 69 are sufficiently fast to provide an extremely high quality sawblade.

Figure 6:
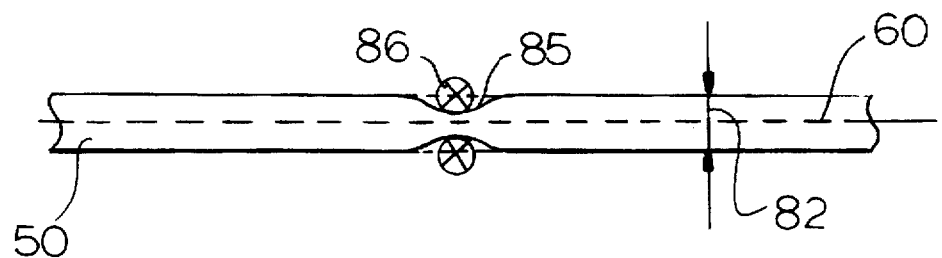
FIG. 6 is a detail of a thickness measurement in the region of a butt-weld between strips of the saw band.

From FIG. 6 it can be seen that a device 86 is provided to detect the thickness 82 of the blade. Usually the band saw blades are welded together from strips end to end and in a region 85 of a weld junction, a thickness defect, e.g. in the form of a constriction can be noted. Utilizing the optoelectronic eyes 86, the thickness change at the regions 85 can be determined and utilizing standard correctional electronics, a correction signal can be provided so that the setting is adjusted accordingly. Should the thickness defect be detrimental to the blade, a warning signal, alarm signal or cut-off signal for the machine can be generated.

Figure 5:
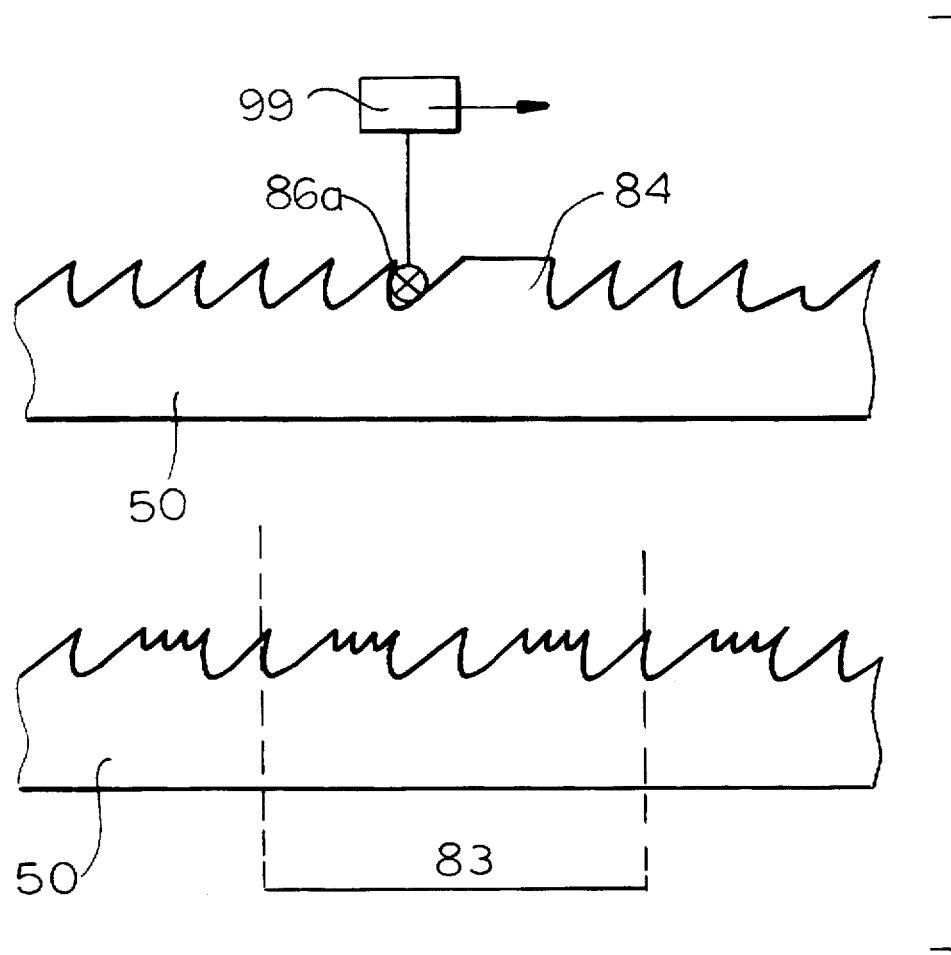
FIG. 5 is a diagrammatic side elevational view of a system for monitoring the teeth for defects.

In FIG. 5 in which two blades are shown, it can be seen that the sawblades may have groups 83 of teeth in which, for example, a multiple-tip tooth is followed by a single point tooth (lower blade) while in the upper blade, a region 84 may be defective in that it omits any teeth. The sensor 86a in the upper blade of FIG. 5 detects individual teeth and only upon determining the absence of a tooth as in the region 84 will a signal be transmitted from the circuitry 99 as a warning, alarm or shut-down signal. The lower blade tooth arrangement has a pattern as indicated at 83 and the monitoring of this blade will cause an alert or shut-down signal only when this pattern is defective.

Of course, with the blade 50 in the upper part of FIG. 5, alternating teeth are set to opposite sides. With the blade of the lower portion of FIG. 5 only certain teeth are set to each side. In either case the determination of a defect by the optoelectronic eye will interrupt the setting process or alert the operating personnel to a defective blade.

Figure 3:
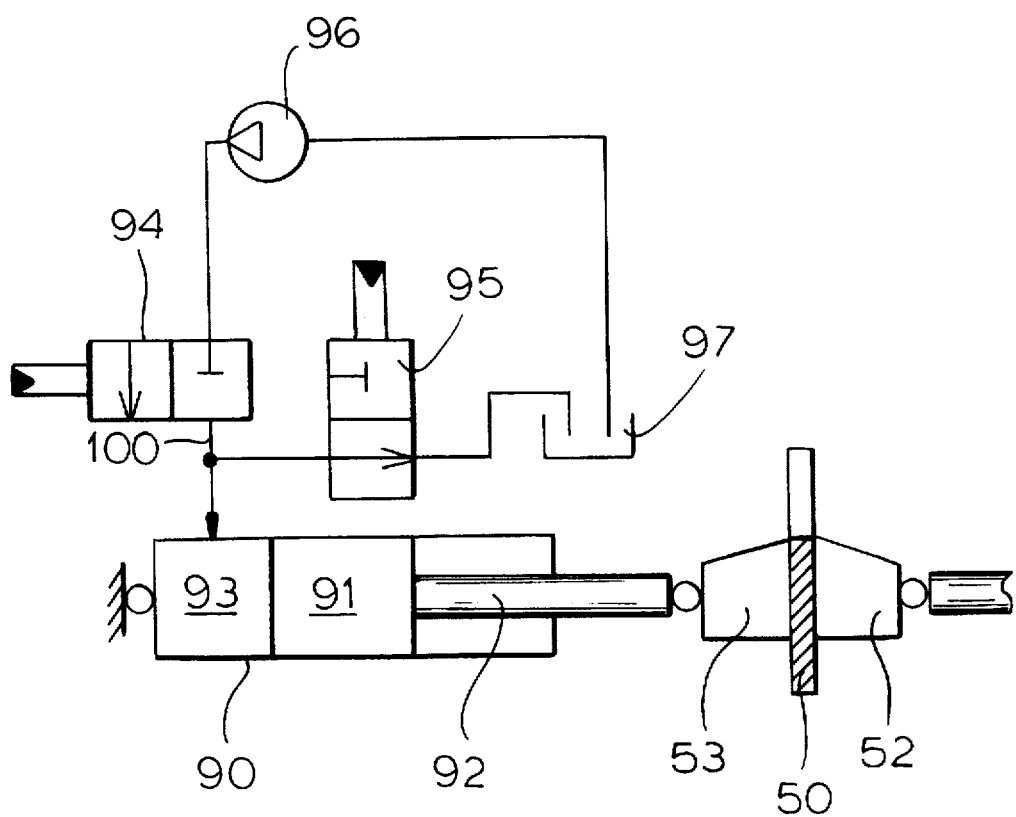
FIG. 3 is a diagram of the hydraulic system for actuating one of the clamping heads or members of the device of FIGS. 1 and 2.

Returning to FIG. 3, it can be seen that clamping heads 52 and 53 can each be displaced by a respective piston and cylinder arrangement 90, one end of which is fixed while the other end bears upon the respective head 52 or 53.

Within each cylinder 90, a piston 91 is displaceable, a piston 91 having a piston rod 92 which is articulated to the head 52 or 53. The piston 91 defines within the cylinder a pressurizable compartment 93 which can be supplied with hydraulic pressure through a pressure line 100. The hydraulic pressure line 100 is fed from the hydraulic pump 96 which draws the medium from a tank 97, via a first valve 94 which either blocks or unblocks the connection of line 100 to the pump 96. This valve is a two-port, two-position valve. In the first valve position, the valve 94 is closed. In the second valve position the valve 94 is open. Control of the valve can be effected electrically.

A branch from the pressure line 100 passes through a second two-port two-position electrically-controlled valve 95 to connect the line 100 to the tank 97. This second valve 95 enables depressurization of the chamber 93. The switching of valve 95 is inverse to the switching of valve 94.

When the first valve 94 is closed and the second valve 95 is open, the chamber 93 is depressurized and the clamping action of heads 52, 53 is released. When valve 95 is closed and valve 94 is open, the pistons 91 brace the clamping heads 52 and 53 against the blade 50.

When the clamp is open, there is only a slight flow back to the tank 97 so that, while the clamping force is removed form the blade, the blade can be displaced but the clamping forces are reapplied quickly. The blade is then displaced through a length equal to the width of the setting members.

Figure 7:
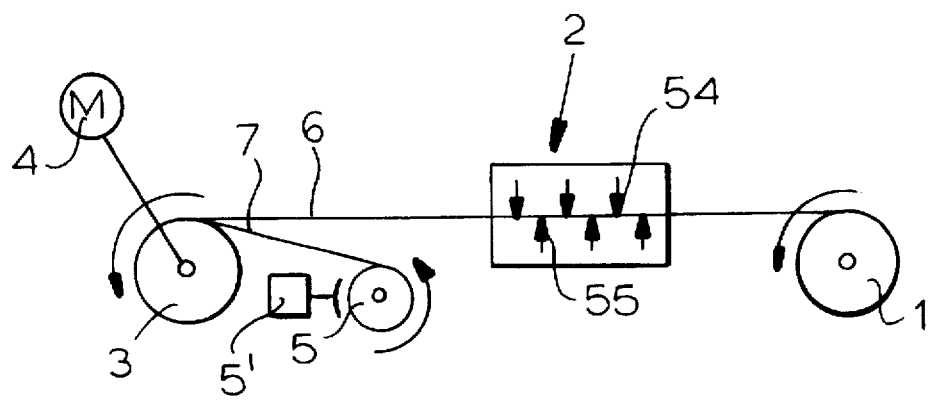
FIG. 7 is a side elevational view showing the uncoiling and recoiling of a saw band in conjunction with the setting in highly diagrammatic form.
Figure 8:
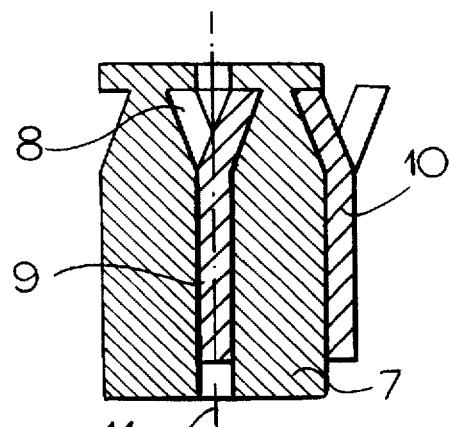
FIG. 8 is a cross sectional view through successive turns of a wound-up coil showing a separator between the turns.

FIGS. 7 and 8 show the apparatus complete with the supply coil and take-up coil. The blade here represented at 6 is fed from a supply coil 1 and passes through the tooth setting unit 2 in a stepped manner as has already been described. A number of teeth are then set after the blade is clamped, and after setting, the clamp is opened for advance of the blade through the setting unit 2. Instead of a setting unit, of course, a hardening system can be provided as illustrated at 2' in FIG. 10. The setting members have been represented at 54 and 55 by arrows in FIG. 7. The hardening unit 2' can provide for vacuum hardening of the previously set teeth in the embodiment shown in FIG. 10.

With respect to FIG. 7, it can be seen that after setting of the teeth, the blade can be wound on a take-up coil 3. The take-up coil 3 is driven by a motor 4 which can be coupled with the spool or core on which the coil 3 is formed.

According to a feature of the invention, a separator coil or spool 50 can be provided with an axis parallel to the axis of the take-up coil 3 and can dispense a strip of separator material, e.g. paper of sufficient thickness so that, when the paper strip 7 is inserted between turns of the blade, the set teeth of the blade do not engage. The strip 7 may be of a width greater than the width of the sawblade or equal to the latter but is at least of a width equal to the tooth portion band saw.

The coil 9 can be free to rotate although if desired, a brake device 5' can be provided to limit overrunning of the supply coil.

As can be seen from FIG. 8, the strip 7 can be lodged between turns 9 and 10 of the sawblade on the take-up coil 3. The separating strip 7 is drawn from the coil 5 at the same speed at which the band saw is wound up in the coil 3. A slight braking of the separator coil prevents loops from forming in the strip 7 and allows a certain tension to be maintained in the separating strip.

Figure 9:
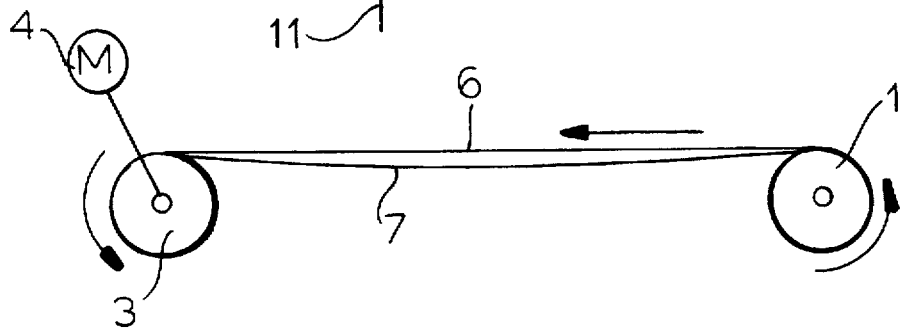
FIG. 9 is a diagram illustrating a blade recoiling device.

FIG. 9 shows a system in which the sawblade 6 is simply unwound and the strips 7 are simply unwound from a supply coil 1 and rewound into a take-up coil 3. The rewinding allows the sawblade to be properly oriented for vacuum hardening of the teeth, that is, with the backs of the teeth preceding.

Figure 10:
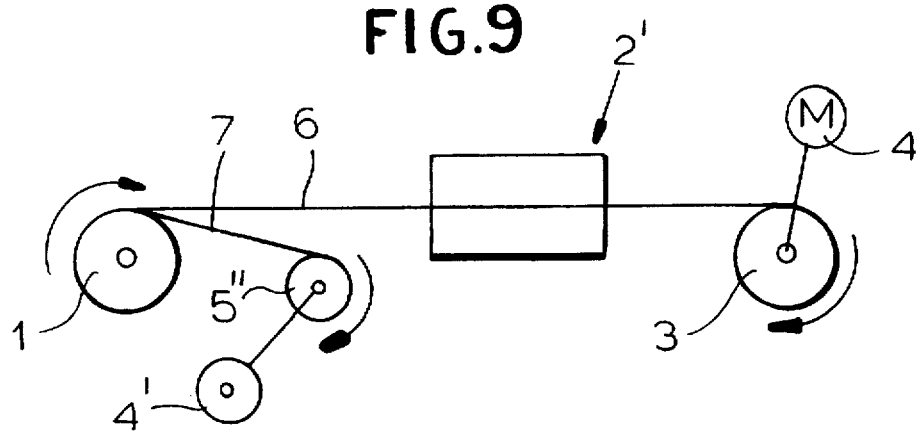
FIG. 10 is a diagrammatic elevational view of a blade hardening system according to the invention.

In FIG. 10, it will be apparent that the band saw 6 is drawn from the supply coil 1 with take-up of the separator strip 7 on the coil 5" driven by a motor 4' before passing through the hardening unit 2' and being rewound on the take-up coil 3 driven by the motor 4. The material of the separating strip can be a relatively thick paper as illustrated in FIG. 8 and the paper can project to both sides of the turns 9 and 10 of the sawblade whose teeth 8 are set to either side of the median blade plane 11.

In spite of the fact that the teeth are set to opposite sides, therefore, the separating material 7 prevents contact between them in the turns 9 and 10 of the coil. 1 The thickness of the strip 7 should be sufficient to enable penetration of the teeth 8 into the separator without contacting the teeth of the adjacent turn. Contact of sharp edges with one another or sharp edges with flanks of adjacent teeth is thus avoided and the sharpness of the teeth retained. The tension of the turns is also maintained so that relative displacement of turns cannot occur.

I claim:

1. A device for setting a row of teeth of a sawblade, said device comprising:

a pair of clamping members disposed on opposite sides of a sawblade having a row of teeth to be set and engageable with said opposite sides below a tooth-foot line of said row;

means operatively connected with said clamping members for pressing said clamping members against said sides of said sawblade;

a pair of separate setting members on opposite sides of said row of teeth and having respective setting surfaces juxtaposed with teeth of the row, said setting members having fixed starting positions in which said setting members are simultaneously in clamping-free engagement with said sawblade from opposite sides, said setting surfaces defining a setting-tool angle between them in said starting position which is at least equal to a setting angle defined between outer tooth side planes upon setting of the teeth; and means for angularly displacing said setting members in opposite senses to press said setting surfaces against the teeth of said row and set said teeth so that outer tooth side flanks of set teeth lie in said outer tooth side planes at said setting angle.

2. The device defined in claim 1 wherein said means for displacing said setting members includes means for enabling displacement of said setting members transverse to said sawblade only in the form of angular movement of said setting members.

3. The device defined in claim 2 wherein said means for displacing said setting members includes means for effecting simultaneous angular movement of said setting members in opposite senses.

4. A device for setting a row of teeth of a sawblade, said device comprising:

a pair of clamping members disposed on opposite sides of a sawblade having a row of teeth to be set and engageable with said opposite sides below a tooth-foot line of said row;

means operatively connected with said clamping members for dressing said clamping members against said sides of said sawblade;

a pair of setting members on opposite sides of said row of teeth and having respective setting surfaces juxtaposed with teeth of the row, said setting members having starting position in which said setting members are in clamping-free engagement with said sawblade, said setting surfaces defining a setting-tool angle between them in said starting position which is at least equal to a setting angle defined between outer tooth side planes upon setting of the teeth; and means for displacing said setting members to press said setting surfaces against the teeth of said row and set said teeth so that outer tooth side flanks of set teeth lie in said outer tooth side planes at said setting angle, said means for displacing said setting members including means for enabling displacement of said setting members transverse to said sawblade only in the form of angular movement of said setting members, each of said setting members being provided with a circular guide along which said setting members are displaceable, each of said setting members engaging said row of teeth along a contact line in said rest position, said circular guides being centered on said contact lines.

5. The device defined in claim 4 wherein said clamping members have upper surfaces each including an angle greater than 90° with a median longitudinal plane of the sawblade, said setting members having undersides in said starting position substantially parallel to the respective upper surface.

6. A device for setting a row of teeth of a sawblade, said device comprising:

a pair of clamping members disposed on opposite sides of a sawblade having a row of teeth to be set and engageable with said opposite sides below a tooth-foot line of said row;

means operatively connected with said clamping members for pressing said clamping members against said sides of said sawblade;

a pair of setting members on opposite sides of said row of teeth and having respective setting surfaces juxtaposed with teeth of the row, said setting members having starting position in which said setting members are in clamping-free engagement with said sawblade, said setting surfaces defining a setting-tool angle between them in said starting position which is at least equal to a setting angle defined between outer tooth side planes upon setting of the teeth; and means for displacing said setting members to press said setting surfaces against the teeth of said row and set said teeth so that outer tooth side flanks of set teeth lie in said outer tooth side planes at said setting angle, said means for displacing said setting members including means for enabling displacement of said setting members transverse to said sawblade only in the form of angular movement of said setting members, each of said setting members being mounted on a respective pivotable holder, said device further comprising an electric motor and toothed-belt means operatively connecting said electric motor with said holders for angularly displacing said setting members.

7. The device defined in claim 6 wherein said electric motor is a three-phase servomotor controlled by an angle generator and the angular displacement is monitored by a tachogenerator measurement of actual angular displacement compared with a set-point angular displacement.

8. The device defined in claim 5, further comprising means for measuring actual tooth set on opposite sides of said sawblade and comparing measured actual tooth set with a setpoint for tooth set.

9. The device defined in claim 8, further comprising means for measuring a thickness of said sawblade.

10. The device defined in claim 8, further comprising means for monitoring tooth setting and generating a signal upon a failure therein, said signal providing a warning to operating personnel.

11. The device defined in claim 8, further comprising means for monitoring tooth setting and generating a signal upon a failure therein for shutting down said device.

12. The device defined in claim 1 wherein said means operatively connected with said clamping members for pressing said clamping members against said sides of said sawblade is a hydraulic piston and cylinder arrangement.

13. The device defined in claim 1, further comprising means for relatively adjusting the height of said sawblade and said clamping members.

14. A device for setting a row of teeth of a sawblade, said device comprising:

a pair of clamping members disposed on opposite sides of a sawblade having a row of teeth to be set and engageable with said opposite sides below a tooth-foot line of said row;

means operatively connected with said clamping members for pressing said clamping members against said sides of said sawblade;

a pair of setting members on opposite sides of said row of teeth and having respective setting surfaces juxtaposed with teeth of the row, said setting members having starting position in which said setting members are in clamping-free engagement with said sawblade, said setting surfaces defining a setting-tool angle between them in said starting position which is at least equal to a setting angle defined between outer tooth side planes upon setting of the teeth; and means for displacing said setting members to press said setting surfaces against the teeth of said row and set said teeth so that outer tooth side flanks of set teeth lie in said outer tooth side planes at said setting angle, said clamping and setting members being located at a tooth-setting location, said device further comprising a supply coil for said blade upstream of said location and a take-up coil for said blade downstream of said location, and conveying means downstream of said location for advancing said blade from said supply coil to said clamping and setting members and from clamping and setting members to said take-up coil.

15. The device defined in claim 14, further comprising a separator coil for supplying a separator to said take-up coil whereby said separator is wound on said take-up coil between turns of said blade.

16. The device defined in claim 15 wherein said separator coil has an axis parallel to an axis of said take-up coil.

17. The device defined in claim 15 wherein said separator coil is journaled so as to be freely rotatable.

18. The device defined in claim 15, further comprising a brake acting upon said separator so as to prevent over-rotation of said separator coil upon an uncontrolled change in a winding speed of said take-up coil.

* * * * *